United States Patent [19]

Mews et al.

[11] Patent Number: 5,320,547

[45] Date of Patent: Jun. 14, 1994

[54] LAMP SOCKET FOR A FLUORESCENT LAMP

[75] Inventors: Hans-Peter Mews, Lüdenscheid; Peter Morlinghaus, Halver, both of Fed. Rep. of Germany

[73] Assignee: Vossloh-Schwabe GmbH, Lüdenscheid, Fed. Rep. of Germany

[21] Appl. No.: 58,973

[22] Filed: May 6, 1993

Related U.S. Application Data

[63] Continuation of Ser. No. 812,701, Dec. 23, 1991, abandoned.

[51] Int. Cl.$^5$ ............................................. H01R 33/02
[52] U.S. Cl. .................................... 439/227; 439/232
[58] Field of Search ............................. 434/226–229, 434/232, 233, 237, 239

[56] References Cited

U.S. PATENT DOCUMENTS

| | | | |
|---|---|---|---|
| 4,643,503 | 2/1987 | Johnson et al. | 439/227 |
| 4,713,019 | 12/1987 | Gaynor | 439/232 |
| 4,799,896 | 1/1989 | Gaynor et al. | 439/232 |
| 4,906,891 | 3/1990 | Takagi et al. | 439/226 |

FOREIGN PATENT DOCUMENTS

| | | |
|---|---|---|
| 3144580 | 5/1983 | Fed. Rep. of Germany . |
| 3744580 | 8/1989 | Fed. Rep. of Germany . |
| 0086468 | 3/1989 | Japan ..................... 439/227 |

*Primary Examiner*—Larry I. Schwartz
*Assistant Examiner*—Hien D. Vu
*Attorney, Agent, or Firm*—Frishauf, Holtz, Goodman & Woodward

[57] ABSTRACT

To permit easy insertion and removal of a compact fluorescent lamp (2) in and from a socket, the socket is formed with a body (3) having an engagement surface wall (5) from which a shelf (4) projects bounded by side walls (22, 23) to define a base reception cavity (25). The engagement wall (5) is formed with slits (11) to permit terminal pins (13) from the lamp to pass therethrough, for engagement with electrical terminal contacts (T). The lamp is held in position by a resilient catch or latch or snap-over element (14) movably mounted on the engagement wall (5), for example by being molded on a separated strip portion (15) forming a resilient holder, and projecting from the engagement wall (5), to snap over the end portion of a base (35) of the lamp, when inserted. To release the lamp, the catch can be bent backwardly. Holding projections (30) on the shelf lock the lamp in position.

25 Claims, 2 Drawing Sheets

LAMP SOCKET FOR A FLUORESCENT LAMP

This application is a continuation, of application Ser. No. 07/812,701, filed Dec. 23, 1991, now abandoned.

REFERENCE TO RELATED PUBLICATION

German Patent Disclosure Document DE-OS 37 44 580.

FIELD OF THE INVENTION

The present invention relates to lamp sockets for fluorescent lamps, and more particularly to lamp sockets for compact fluorescent lamps which are single-ended, that is, have only one base at one end, from which connecting prongs project.

BACKGROUND

Compact fluorescent lamps, well known, usually have a glass bulb bent into U shape, from which end a single base extends. Connecting pins project from the base. The axes of the connecting pins or lugs extend parallel to the axis of the glass bulb.

Various types of sockets are available for lamps of this kind. In one socket, the insertion of the lamp in the socket, or removal of the lamp, is carried out by a movement parallel to the lamp bulb legs, and hence the socket pins, that is, an insertion or removal movement, in-and-out, in the direction of the legs of the lamp. Fixtures in which such sockets are used thus must provide for sufficient space at the end of the lamp remote from the base thereof. In another type of socket, insertion and removal is carried out by a movement transversely to the base pins. This permits manufacture of a smaller housing, or lamp fixture or luminairs for the compact fluorescent lamp.

The referenced German Patent Disclosure Document DE-OS 37 44 580 describes a lamp socket which has a generally block-shaped socket housing. One side of the socket housing forms an engagement surface for the lamp base and is formed with parallel slits corresponding to the number of socket pins of the lamp. These slits pass through the engagement surface as well as through a side surface of the socket housing. Contact strips or springs extend into the slits to establish electrical contact between the base pins and an external wiring to the lamp. The socket housing is formed with a projecting collar which is formed with a recess at the same side in which the slits pass through the side wall of the socket housing. A small projecting hook extends from the opposite side of the recess. When the lamp base is inserted into the socket, the lamp base is prevented from removal in the direction of the connecting pins by this hook.

The connecting terminals within the housing have, in cross section, approximately hook shape. Upon insertion of the socket pins, they deflect and, as soon as the lamp is completely inserted, the contact pins can return completely or almost completely into their initial position. Due to the hook shape, the contact pins prevent removal of the lamp from the socket. To permit removal, for example if the lamp is defective or has burned out, an additional slider is present in the housing of the socket, engageable with the contact springs, in order to remove the contact springs from the profile of the region of the slits, so that the lamp can be removed from its socket.

It has been found that the provision of an additional slider, and the specifically bent contact springs, which may have a complex shape, substantially increase the manufacturing costs of the sockets. Additional parts must be assembled and the tolerances must be very tight.

THE INVENTION

It is an object to provide a lamp socket in which the lamp can be inserted or removed by a movement transverse to the extent of the base pins and in which the lamp, once inserted, is held in the socket by elements which do not engage the base pins.

Briefly, the socket includes a body which is, basically, for example, essentially plate-like, and forms an engagement surface adapted to fit against a matching base engagement surface on the base of the lamp. The engagement surface is formed with reception slits to receive the connecting pins projecting from the base of the lamp. The slits extend parallel to each other and pass through the engagement surface, extending to the end portion thereof. Terminal contact elements are located on the body at a surface thereof remote from the socket engagement surface; they are suitably positioned for engagement with the connectings pins of the lamp, when a lamp is inserted in the socket.

A shelf element projects away from the socket engagement surface of the body, and is retained on the body by two side wall elements located at laterally opposite sides of the body to extend laterally from the engagement surface towards the shelf, which define, together with the base, a base reception space or cavity. The cavity is so designed that it has a clear or free dimension which corresponds to the width of the base of the lamp. A retention element is formed on the body, for example as a resilient hook to retain the base of the lamp in the retention space; it engages over an edge of the lamp base. The retention element, in accordance with a feature of the invention, is formed as a catch or latch or snap-over lock element, movably located on the body and extending from a suitable position on the socket engagement surface into the reception cavity, so that, when a lamp is inserted in the reception cavity, the catch or latch can retain the base of a lamp in position within this cavity.

The use of a retention catch or latch which extends into the cavity, in a way, completes the incomplete cavity to provide engagement of the lamp base within the cavity at all four sides, so that the base will be surrounded at all sides by elements of the socket, namely the shelf, the two side walls, and the retention latch. The lamp, when in position, is locked to the socket in a position transverse to the base pins. The resiliently retained latch or snap-over catch can be deflected from engagement with the lamp by merely pulling back on the latch or a finger-extension thereof, whereupon the lamp can be readily removed from its position in the socket.

The terminal connections or contacts springs are relieved of any function relating to holding the lamp; they only have to make electrical connection and have no mechanical holding function anymore. This permits manufacture of simple contact springs, for example knife blade engagement elements, which, further, has the additional advantage of ensuring excellent electrical connection.

In accordance with a preferred feature of the invention, the resilient catch is preferably so arranged that it can be operated in a direction perpendicular to the engagement surface on the body. This substantially simplifies insertion and removal movement of the resiliently retained catch. Insertion movement is further facilitated by shaping the latch or locking catch element so as to have a quiescent or base position in which the lamp, when inserted, is locked to the socket. This eliminates operating errors because, upon insertion, the catch automatically snaps into its normal or rest position.

The snap-over catch is preferably formed with an inclined surface which recedes from a level with respect to the engagement surface. Upon insertion of the lamp, the snap element is therefor automatically guided away from the lamp and pressed in a direction away from the engagement surface, which facilitates insertion of the lamp. To save material, the inclined surface can be formed by merely two laterally placed inclined strips, rather than by a solid surface element.

Springy elastic holding of the snap catch is easily obtained by placing it at the end of a leaf spring. This leaf spring can be merely a portion of the body, severed by, for example, slits from the engagement surface and permitting resilient deflection of the region which also retains the snap catch. The root of this spring is preferably placed approximately midway of the height of the engagement surface and the leaf spring extends from that point on to the terminal end of the engagement surface, that is, to a position where it defines the limit of the cavity opposite the shelf element.

Axial removal, intended or inadvertent, of the lamp from the socket is prevented by providing two parallel slots in the walls laterally defining the cavity, which receive projecting buttons or tips formed on the lamp base. The slots also form guide elements for the projecting guide buttons on the base for ease of insertion of the lamp into the socket. Another safety device to prevent axial removal of the lamp is a hook-like projection extending from the shelf and engaging the lamp base, when the lamp is inserted into the socket. The lateral slots preferably expand, funnel-like, at their end portions to facilitate insertion of the lamp.

One side wall of the grooves in the side elements defining the cavity can be flush with the engagement surface, to match the shape of the base of the lamp.

The socket can be made easily, and preferably is a single structural unit including the body and the shelf, and, for example, injection-molded of plastic material. The contact springs can be easily mounted at the side of the body remote from the engagement surface. The body, in that region, is preferably formed with a large-area recess, closed off by a cover. This can be obtained, for example, by forming the body as a plate-like element with a surrounding projecting rim, defining a terminal attachment and connecting chamber. The socket is preferably formed with counter-sunk ends, to permit attachment of the socket to lamp fittings or fixtures.

DRAWINGS

FIG. 1 is an isometric drawing of the lamp socket in accordance with the invention; and FIG. 2 is a schematic side view of one type of compact fluorescent lamp for which the socket of FIG. 1 is intended.

DETAILED DESCRIPTION

Figure 1:
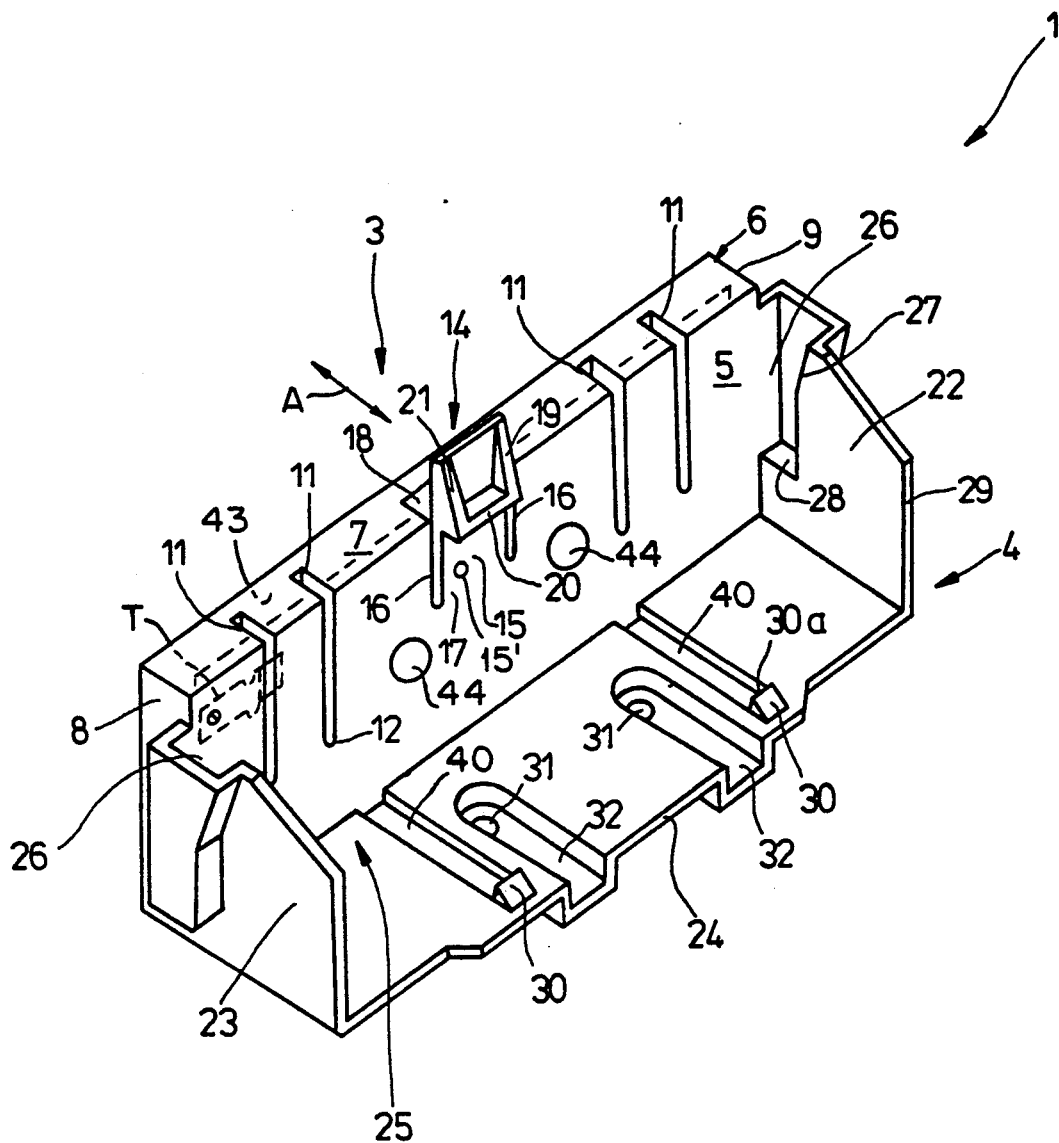
Figure 2:
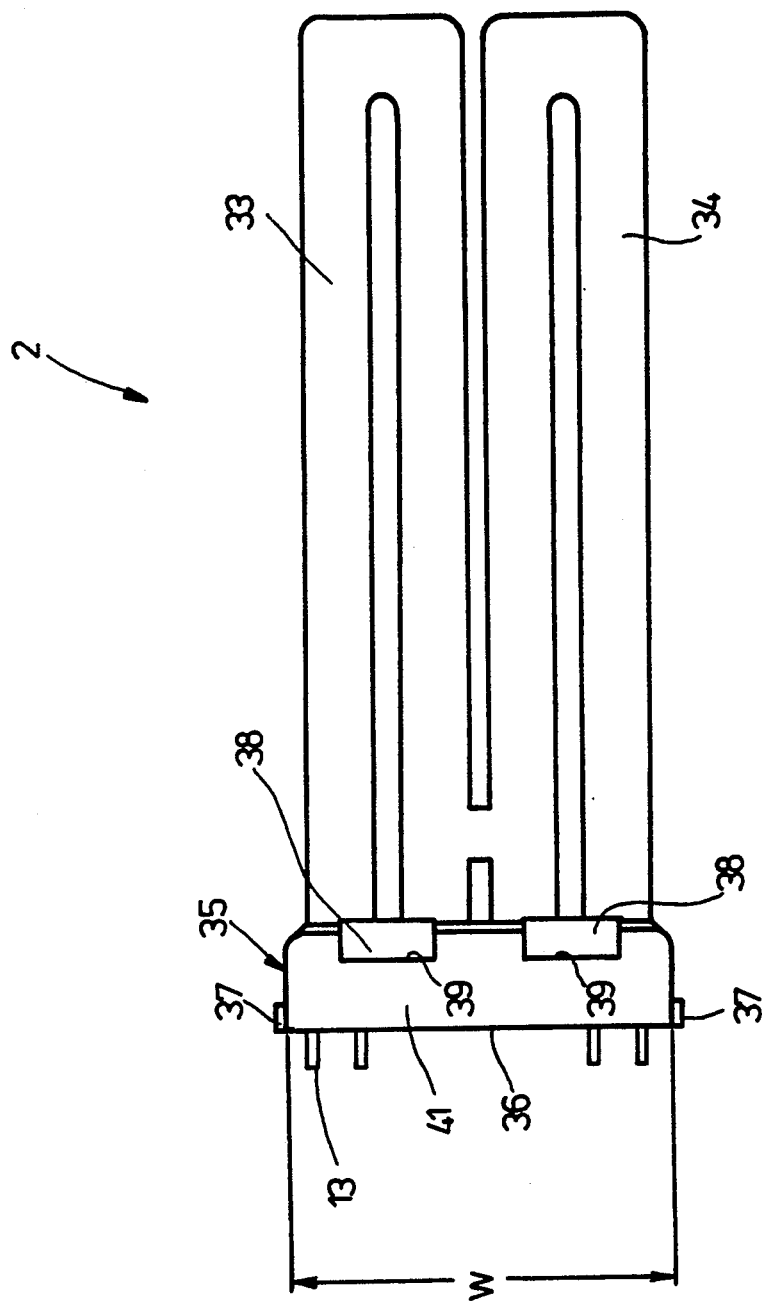

The lamp socket 1 of FIG. 1 is intended to receive a compact fluorescent lamp 2, see FIG. 2. The lamp socket has an essentially block-shaped lamp body 3, which has a forward plate-like engagement surface 5. The body includes, unitary therewith, a shelf element 4.

The body 3 is made of insulating, typically plastic material, and defines a wall with an essentially plane, forward rectangular socket engagement wall surface 5. A strip or rim 6, unitary with the wall surface 5, extends around the rim of the wall surface 5 in a direction (with respect to wall 5) opposite that of the shelf 4. The upper side of the rim 6 merges into two side walls 8, 9 and extends to a bottom rim, not visible. The rims 6, 7, 8, and the not visible lower side, define a connecting or terminal chamber for electrical connection terminals T, of which only one is shown schematically. The terminal or connection chamber can be closed off by a cover which, in plan view, is essentially rectangular, and not visible.

The block or plate element 3 is formed with four essentially parallel slits 11, having flanks or side surfaces likewise parallel to the slits. The slits 11 pass through the surface 5 and through the rim 7. The slits 11 extend completely through the front plate forming the wall surface 5, so that they extend into the connecting or terminal chamber. The slits 11 have a lower end 12, which is just below the center of the engagement surface 5, with reference to its vertical extent. The slits 11 are spaced from each other in such a manner that contact pins 13 (FIG. 2) of the lamp 2 fit therein. Slits 11 form reception slits for contact pins 13 on the lamp.

Terminal elements T are located within a connecting chamber 43, which terminal elements have contact surfaces extending into the slits 11, so that contact pins 13 of a lamp 2 inserted into the socket make electrical connection with the respective terminal T. Since the terminal elements T, which may be found as connecting springs can have any suitable shape, they are shown only schematically in interfering position with respect to one slit 11.

A latch element 14, forming a retention means, is located roughly centrally between the slits 11. The latch element 14 includes a leaf spring element 15, which can be unitary with the plate forming the wall surface 5 and severed therefrom merely by slits 16. Latch element 14 can be resiliently deflected from its quiescent or rest position, shown in FIG. 1. The transition portion 17 of the spring 15 and the remainder of the surface or wall 5 is located approximately at the middle of the vertical extent of the surface 5, as seen in FIG. 1.

The leaf spring 15 extends upwardly above the upper rim 7. The upper rim 7, and the plate element having the wall surface 5, is formed with a recess 18 in order to permit deflecting movement of the leaf spring 15 in the direction towards the back side of the body 3, as schematically shown by the arrow A.

At the front side, the leaf spring 15 has an inclined surface, formed by three continuous unitary strips 19, 20, 21, which project forwardly, at a right angle, from the front side of the leaf spring 15. The strip 20 is parallel to the upper rim 7 and forms a cross strip. The strips 19, 21 are parallel to the longitudinal extent of the leaf spring 15 and start from the strip 20 to terminate at the free end of the leaf spring 15, projecting from the wall surface 5. At the terminal end, the strips 19, 21 merge into the thickness of the leaf spring 15, so that, looked at from the side, the strips 19, 21 have roughly triangular shape. Thus, the strips 19 and 21, together with the strip 20 and the spring 15, form a latch hook which projects from the wall surface 5 and which is movable at essentially a right angle from the surface 5 in a plane approximately at right angles thereto. This resilient deflection of the latch element occurs about a pivot or deflecting axis which is essentially parallel to the upper rim 7 to permit release of a base from the socket, as will appear below.

The wall portion 24, defining a shelf element 4 has a shelf base which is integral with the side, or lateral wall portions 22, 23. The wall portions 22, 23 as well as the shelf base 24 merge with and are integral with the wall surface 5, for example being a single plastic unit.

The two wall portions 22, 23 are parallel to each other and spaced from each other. They form projecting extensions of the side walls or side rims 8, 9 of the base body 3. The shelf base 24 of the shelf 4 extends between the wall portions 22, 23 at the bottom of the socket 1—with respect to FIG. 1—and projects from below the end 12 of the slits 11. Thus, the shelf 4 is open at the upper side. The shelf and the wall portions, thus, form a lamp base reception or retention cavity or space 25 to receive the base 35 of the lamp 2 (FIG. 2). Where the lamp is inserted into the socket, the lamp socket is retained in the cavity 25. This cavity 25 extends parallel to the shelf base 24 which extends from the wall 5 at right angles. The cavity 25 has a width which corresponds to the width W of the base 35, with clearance, and is also approximately the same as the overall width of the body 3.

The walls 22, 23 merging with the shelf 4 are formed with mirror-symmetrical facing grooves 26. One side wall of the groove 26 merges smoothly with the engagement surface 5 of the engagement wall. The grooves 26 are open at the upper end, that is, at the same end at which the slits 11 are open as they pass through the upper shelf 7. The upper end portion of the grooves 26 is expanded in funnel-like shape, as seen at 27. After the funnel-like expansion, and going downwardly in the grooves, the grooves 26 are of constant width and terminate at end surfaces 28 somewhat above a bottom shelf wall forming the bottom of cavity 25 of the shelf 4.

The wall portions 22, 23, as well as the shelf base 24, extend forwardly from the wall 5 by about the same distance. The shelf base 24, as well as the wall portions 22, 23, terminate at the common forward edge 29.

Adjacent the edge 29 on the shelf base 24, two, in cross section approximately triangular-shaped projections or hooks 30 extend upwardly, having a latching or locking or hook surface 30a which faces the engagement surface 5. Slits 40 extend from the hooks 30 towards the back wall 5. These slits are desirable to permit easy molding of the socket; they have no effect or function with respect to holding a lamp 2 in the socket 3.

The socket 1 is formed with bores 44 to permit attachment of the back wall to a lamp fixture, luminaire, or other support. Additional attachment bores 31 are formed in the shelf 4. The bores 31 are recessed in grooves 32, which are open towards the forward edge 29, in order to simplify manufacture of an injection-molding form for the socket. The particular shape of the recesses 32 or 40 does not have any influence on the function of the socket. Preferably, the attachment holes 31, 44 are countersunk.

Socket 1 is intended to receive the lamp 2 (FIG. 2). The lamp 2 has two adjacent U-shaped discharge units 33, 34, which are suitably connected and, in turn, coupled at their free ends in a lamp base 35, where they are securely retained, as well known. The lamp base 35 has an essentially oval cross section. Four projecting contact pins 13 project from a bottom surface 36, which forms a base engagement surface for the socket. The pins 13 are axial parallel with respect to each other and, for example, can be located on a single straight line extending transversely of the base. The base is a plastic molded, for injection-molded element. Locating projections 37 extend laterally adjacent the bottom or base surface 36 from the base 35. The projections 37, in cross section, are essentially rectangular, and located at the level of the exit of the connecting pins 13 from the base surface 36. The projections 37, measured in a direction perpendicular to the base surface 36, corresponds to the spacing of the side walls of the grooves 26 of the socket 1. The grooves 26 form a guide means for guide elements 37 on the lamp. The base has four recesses 38 which terminate in walls 39, spaced from the bottom surface 36. The spacing of the walls 39 from the bottom surface 36 is the same as the spacing of the latching surface 30a from the engagement surface 5.

Insertion and removal of a lamp in the socket

The lamp 2 is inserted in the socket 1 by first placing the locating projections 37 on the base of the lamp into the expanded end portions 27 of the grooves 26. Upon such engagement, the bottom surface 36 of the base also engages one of the inclined ribs or strips 19, 21 of the latch element 14. The projecting contact pins 13 slide into the slits 11 through the openings formed in the upper rim 7 of the base body 3. Upon further insertion movement of the lamp and its base 35 transversely to the axis of the pins 13, and in the direction towards the bottom wall 24 of the shelf 4, the latch element 14 is pressed from its quiescent position shown in FIG. 1 gradually in the direction of the back wall of the housing body 3 and coutner the effect of the leaf spring 15. Upon continued insertion, the latch element 14 slides with its cross strip 20, forming a holding or locking portion of element 14, on the bottom surface 36, while the base 35 is moved downwardly, with respect to FIG. 1, in the direction towards the shelf unit 4. When, finally, the base 35 with its flat side 41 (FIG. 2) engages the shelf base 24 of the shelf 4, the latch element 14 can snap back into its quiescent position and over one of the surfaces 41 of the lamp base 35. The base is retained in the cavity, and the strip 20 of the latch element extends over the upper surface 41 of the base 35 of the lamp. The base 35 has two surfaces 41, one on either side of the base, that is, the base is mirror-symmetrical. The strip 20, when it has snapped over the base 35, will be parallel to and spaced from the upper surface 24 of the shelf unit 4; this spacing is selected to conform to the distance which the two flat sides 41 of the base 35 have from each other.

The inclined side wall portions 27 of the grooves 26 guide the base 35 or, rather, its lateral projections 37, within and into the bottom of the grooves 26. Thus, the lamp is gradually, but definitely guided to engage the engagement surface 5 when the lamp 2 is retained in the socket 1.

The end wall 28 at the bottom of the grooves 26 is spaced from the shelf base 24 by a distance such that the lateral projections 35 do not engage the end wall, that is, provide some clearance, when the base 35 is engaged with its side wall 41 on the surface 24 of the shelf unit 4.

The two hooks, forming triangular projections, grip behind the recessed walls 39 of the base 35 and prevent tipping of the lamp 2 with respect to the engagement surface 5. The projecting height of the hooks 30 formed as triangular projections above the surface 24 corresponds to the depth of the recesses 38, measured perpendicularly to the side walls 41 of the base 35.

To remove the lamp, the latch element 14 is pulled backwardly towards the back side of the housing body 3 until the strip 20, which projects by about 1-2 mm forwardly above the surface 5, clears the bottom surface 36 of the base 35 of the lamp. This permits removal of the lamp 2 transversely to the axis of the connecting pins 13 from the socket 1.

The socket 35, in accordance with a preferred feature of the invention, can retain the lamp base 1 under some resilient bias or strain. To do so, small projecting bumps, of which only one is shown at 15', of about 0.5 mm projecting height, can be placed in the angular region beneath the strip 20. When the base 35 is inserted, these small bumps will engage the bottom surface 36 of the lamp base. The effect of these bumps is to engage the lateral projections 37 of the lamp base against the sides of the grooves 26 of the sacket, and the engagement wall portions 39 of the lamp base against the hook surfaces 30a of the hooks 30 of the socket due to the resiliency of the leaf spring 15.

The dimensions of the socket 1 are matched to the dimensions of the lamp base 35, that is, they have to be so arranged that the lamp base can properly fit into the socket, in order to obtain the above-described interaction between the lamp socket 1 and the base 35. The spacing of the two side walls 22, 23 retaining the shelf 4 corresponds to the largest dimension W of the base 35, measured on a line connecting the socket terminal pins 13. The projections 37 extend beyond this dimension W.

Various changes and modifications may be made within the scope of the inventive concept.

We claim:

1. Lamp socket (1) for a fluorescent lamp (2) having a lamp base (35) and at least two adjacently located parallel projecting connection pins (13), projecting from said base, said base defining a side surface (41) and a base engagement surface (36), said base being formed with locating projections (37) and a recessed engagement wall portion (39);

said socket having a body (3);

a socket engagement wall surface (5) formed on said body, adapted to fit against the base engagement surface (36) of the lamp base (35);

reception slits (11) formed in the socket engagement wall surface (5) for passage of the connection pins (13) therethrough, said slits extending parallel to each other and passing through said engagement wall surface (5) to and including an end portion (7) thereof to define open ends into which the connection pins (13) of the lamp (2) can be inserted, and subsequently slid longitudinally in the slits;

terminal contact means (T) located on said body at a surface thereof remote from said engagement wall surface (5) and positioned for engagement with the connection pins (13) of the lamp;

a shelf (4) projecting away from the engagement wall surface (5) of the body and two side wall means (22, 23) located at laterally opposite sides of the body and extending therefrom laterally of said engagement wall surface towards said shelf, to define a base reception cavity (25) therebetween having a clear or free dimension in a direction transverse to said slits (11) which corresponds to the width (W) of the base (35) of the lamp (2);

said body (3) including said shelf (4), said engagement wall surface (5), and said side wall means (22, 23) comprising a unitary element of plastic material;

retention means comprising a latch or catch or locking element (14) said body for retaining the base (35) of the lamp (2) in said base reception cavity (25), and said engagement wall surface (5) of the socket body (3) in engagement with the base engagement surface (36) of the lamp base (35), wherein the retention means (14) is unitary with said body (3), partially severed from said engagement wall surface (5), resiliently movably retained on said engagement wall surface (5) of said body for movement in a direction perpendicular to said engagement wall surface and having a quiescent position in which it projects into said reception cavity (25) from said socket engagement wall surface which corresponds to the position of said latch element when the fluorescent lamp is inserted in said cavity (25) to retain said lamp in said cavity (25) by said catch or latch or locking element, said catch or latch or locking element (14) having a latching portion (20) engageable over said lamp base (35) and extending essentially parallel to the side surface (41) of said lamp base;

and respective projection or recess means formed on at least one of: said side wall means (22, 23) and said shelf (4), at least one of said projections, or recesses being positioned for respective engagement with at least one of: said locating projections (37) of the lamp base (35) and said recessed engagement wall portion (39) of the lamp base.

2. Lamp socket (1) for a fluorescent lamp (2) having a lamp base (35) including at least two adjacently located parallel connection pins (13) and guide elements (37) projecting from said base, said base defining a base engagement surface (36);

said socket having a body (3);

a socket engagement wall surface (5) formed on said body, adapted to fit against the base engagement surface (36) of the lamp base (35);

reception slits (11) formed in the engagement wall surface (5) for passage of the connection pins (13) therethrough, said slits extending parallel to each other and passing through said engagement wall surface (5) to and including an end portion (7) thereof to define open ends into which the connection pins (13) of the lamp can be inserted and subsequently slid longitudinally of the slits;

terminal contact means (T) located on said body at a surface thereof remote from said engagement wall surface (5) and positioned for engagement with the connection pins (13) of the lamp;

a shelf (4) projecting away from the engagement wall surface (5) of the body (3), and two side wall means (22, 23) located at laterally opposite sides of the body and extending therefrom laterally of said engagement wall surface towards said shelf (4), to define a base reception cavity (25) open at a region opposite said shelf, having a clear or free dimension in a direction transverse to said slits (11) which corresponds to the width (W) of the base (35) of the lamp (2); and .

retention means (14) comprising a latch or catch or locking element (14) on said body for retaining the base (35) of the lamp in said reception cavity (25) and, further, for holding said engagement wall surface (5) of the socket in engagement with the base engagement surface (36) of the lamp base (35), wherein, in accordance with the invention, the latch or catch or locking element (14) is located on said engagement wall surface (5) of said body (3) and movably coupled to said body for movement in a direction perpendicular to said engagement wall surface (5) and projects into said reception cavity (25) from said socket engagement wall surface;

wherein said side wall means (22, 23) are parallel to each other, are essentially straight, and parallel to said slits (11); and guide means (26) are formed on said side wall means positioned for complementary cooperation with the guide elements (37) on said lamp base (35).

3. The socket of claim 2, wherein said catch or latch element (14) has a quiescent position which corresponds to the position of said latch element when the fluorescent lamp is inserted in said cavity (25) and retained therein by said catch or latch element.

4. The socket of claim 2, wherein the catch or latch element (14) has an inclined surface region which extends from a projecting region, extending away from said engagement wall surface (5), at an inclination to approximately the level of said engagement wall surface (5) at a position of said catch or latch element which is elevated with respect to said shelf (4).

5. The socket of claim 4, wherein said inclined surface region is formed by side surfaces of inclined strips (19, 21).

6. The socket of claim 2, including a leaf spring means (15) retaining said latch or catch or locking element (14).

7. The socket of claim 6, wherein said engagement wall surface (5) and said leaf spring means (15) are unitary portions of said body (3).

8. The socket of claim 6, wherein the leaf spring means (15) extends in a direction perpendicular to the projection of said shelf (4).

9. The socket of claim 2, wherein said guide means (26) in the side wall means (22, 23) comprise guide grooves, open towards said reception cavity (25).

10. The socket of claim 9, wherein the side wall means (22, 23) of said guide grooves (26) are parallel.

11. The socket of claim 9, wherein said guide grooves are open towards an open and adjacent the terminal portion thereof, and are expanded in funnel shape to facilitate insertion of said guide elements (37) on the lamp base.

12. The socket of claim 9, wherein one side wall of each guide grooves (26) is flush with said engagement wall surface (5).

13. The socket of claim 2, further including a connecting terminal chamber (43) formed in said body (3) behind said engagement wall surface (5).

14. The socket of claim 2, wherein at least one of: said body (3); said shelf (4) comprises plastic material.

15. The socket of claim 2, wherein said body (3) is plate-like to define said engagement wall surface (5) and formed with surrounding rims (7, 8, 9) extending in a direction opposite and away from said engagement wall surface (5) to define a terminal mounting space or chamber (43) for the terminal contact means (T).

16. The socket of claim 2, wherein said catch or latch or locking element has a locking surface (20) engageable over a side surface (41) of the base (35) of the lamp (2).

17. Lamp socket (1) for a fluorescent lamp (2) having a lamp base (35) including at least two adjacently located parallel connection pins (13) projecting from said base, said base defining a base engagement surface (36) and an engagement wall portion (39);

said socket having a body (3);

a socket engagement wall surface (5) formed on said body, adapted to fit against the base engagement surface (36) of the lamp base (35);

reception slits (11) formed in the engagement wall surface (5) for passage of the connection pins (13) therethrough, said slits extending parallel to each other and passing through said engagement wall surface (5) to and including an end portion (7) thereof to define open ends into which the connection pins (13) of the lamp can be inserted and subsequently slid longitudinally of the slits;

terminal contact means (T) located on said body at a surface thereof remote from said engagement wall surface (5) and positioned for engagement with the connection pins (13) of the lamp;

a shelf (4) projecting away from the engagement wall surface (5) of the body (3), and two side wall means (22, 23) located at laterally opposite sides of the body and extending therefrom laterally of said engagement wall surface towards said shelf (4), to define a base reception cavity (25) open at a region opposite said shelf, having a clear or free dimension in a direction transverse to said slits (11) which corresponds to the width (W) of the base (35) of the lamp (2); and retention means comprising a latch or catch or locking element (14) on said body for retaining the base (35) of the lamp in said reception cavity (25) and, further, for holding said engagement wall surface (5) of the socket in engagement with the base engagement surface (36) of the lamp base (35), wherein, in accordance with the invention, the latch or catch or locking element (14) is located on said engagement wall surface (5) of said body (3) and movably coupled to said body for movement in a direction perpendicular to said engagement wall surface (5) and projects into said reception cavity (25) from said socket engagement wall surface;

wherein said shelf (4) is formed with a shelf wall (24) which extends between said side wall means, and essentially at right angles with respect to said socket engagement wall surface (5); and wherein at least one hook-like projection (3) extends from said shelf wall (24) into said reception cavity (25) for engagement with said engagement wall portion (39) of the lamp base (35).

18. The socket of claim 17, wherein the socket body (3) and the shelf (4) form a single unitary element.

19. The socket of claim 17, wherein said catch or latch or locking element has a locking surface (20) engageable over a side surface (41) of the base (35) of the lamp (2).

20. The socket of claim 17, wherein said catch or latch element (14) has a quiescent position which corresponds to the position of said latch element when the fluorescent lamp is inserted in said cavity (25) and retained therein by said catch or latch element.

21. The socket of claim 17, wherien the catch or latch element (14) has an inclined surface region which extends from a projecting region, extending away from said engagement wall surface (5), at an inclination to approximately the level of said engagement wall surface (5) at a position of said catch or latch element which is elevated with respect to said shelf (4).

22. The socket of claim 17, including a leaf spring means (15) retaining said latch or catch or locking element (14); and wherein said engagement wall surface (5) and said leaf spring means (15) are unitary portions of said body (3).

23. The socket of claim 22, wherein the leaf spring means (15) extends in a direction perpendicular to the projection of said shelf (4).

24. The socket of claim 17, further including a connecting terminal chamber (43) formed in said body (3) behind said engagement wall surface (5).

25. The socket of claim 17, wherein at least one of: said body (3); said shelf (4) comprises plastic material.

* * * * *